(12) United States Patent
Cowelchuk et al.

(10) Patent No.: US 7,221,266 B2
(45) Date of Patent: May 22, 2007

(54) THEMATIC VEHICLE INTERIOR

(75) Inventors: Glenn A. Cowelchuk, Chesterfield Township, MI (US); David Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 282 days.

(21) Appl. No.: 10/711,448

(22) Filed: Sep. 20, 2004

(65) Prior Publication Data

US 2006/0061465 A1 Mar. 23, 2006

(51) Int. Cl.
*B60Q 1/00* (2006.01)

(52) U.S. Cl. .......................... 340/460; 340/438; 701/1

(58) Field of Classification Search ................ 340/460, 340/457, 438, 426.28, 384.1, 442, 457.1; 381/61, 86; 701/1
See application file for complete search history.

(56) References Cited

U.S. PATENT DOCUMENTS

| | | | |
|---|---|---|---|
| 5,005,004 A | | 4/1991 | Udofot |
| 5,481,243 A | | 1/1996 | Lurie et al. |
| 5,635,903 A | * | 6/1997 | Koike et al. ................ 340/441 |
| 6,100,792 A | * | 8/2000 | Ogino et al. ........... 340/426.25 |
| 6,130,605 A | * | 10/2000 | Flick ...................... 340/426.23 |
| 2003/0064746 A1 | | 4/2003 | Rader et al. |
| 2004/0150517 A1 | * | 8/2004 | Okita et al. .............. 340/457.1 |
| 2004/0178902 A1 | * | 9/2004 | Koike et al. ............. 340/457.1 |
| 2005/0040941 A1 | * | 2/2005 | Schofield et al. ........... 340/442 |
| 2005/0275509 A1 | * | 12/2005 | Flick ........................ 340/426.1 |

* cited by examiner

*Primary Examiner*—Phung T. Nguyen
(74) *Attorney, Agent, or Firm*—Earl J. LaFontaine, Esq.

(57) ABSTRACT

A thematic vehicle interior (10) is provided. The thematic vehicle interior (10) is comprised of a passenger cabin, a cosmetic trim (14) for attachment to the vehicle (12) within the passenger cabin, and a feedback system (16) for playing one or more audio programs. The audio programs are utilized in combination with the cosmetic trim (14) for creating a predetermined theme. Additionally, the audio programs are also utilized for indicating one or more predetermined vehicle conditions. The vehicle conditions include one or more of the following: an open-door condition, a low-fuel condition, a maintenance-required condition, a low-tire-pressure condition, a headlights-on condition, a key-in-the-ignition condition, an unfastened-seatbelt condition, an engine-start condition, and an engine-shut-off condition. Also, the thematic vehicle interior (10) includes a sensor (18) for detecting a vehicle condition and actuating the feedback system (16) to play the audio program.

16 Claims, 2 Drawing Sheets

THEMATIC VEHICLE INTERIOR

TECHNICAL FIELD

The present invention relates generally to vehicle passenger cabins, and more particularly to a vehicle passenger cabin that provides auditory sounds and visual features for creating a predetermined theme while notifying the vehicle occupant of one or more vehicle conditions.

BACKGROUND OF THE INVENTION

Automotive manufacturers currently produce vehicles having passenger cabins with various kinds of cosmetic trim. Typically, the cosmetic trim is substantially uniform throughout each passenger cabin so as to create a specific style. For instance, a well-appointed luxury car can include leather seats, wood-trimmed doors, a wood-trimmed steering wheel, a wood-trimmed gear shift, and a wood-trimmed dashboard fascia. Also, a typical sports car can include two-tone leather seats, metallic dashboard fascia, a leather-trimmed steering wheel, and a leather-trimmed gear shift.

Moreover, these vehicles typically include substantially similar warning systems for alerting an occupant when the warning systems detect predetermined vehicle conditions. For example, the warning systems of various cars typically play a generic chime when the warning systems detect that a vehicle door is open and a key has been left in the ignition. However, it is also understood that the warning systems typically utilize generic chimes for indicating a variety of other vehicle conditions. In addition, it will also be appreciated that these warning systems are integrated within various other kinds of vehicles besides luxury cars and sports cars.

It would therefore be desirable to provide thematic vehicle passenger cabin that coordinates a warning system and a cosmetic trim of the interior so as to provide a predetermined theme.

SUMMARY OF THE INVENTION

In one advantageous embodiment of the claimed invention, a thematic vehicle interior is provided. The thematic vehicle interior is comprised of a passenger cabin, a cosmetic trim for attachment to the vehicle within the passenger cabin, and a feedback system for playing one or more audio programs. The audio programs are utilized in combination with the cosmetic trim for creating a predetermined theme. Additionally, the audio programs are also utilized for indicating one or more predetermined vehicle conditions. The vehicle conditions include one or more of the following: an open-door condition, a low-fuel condition, a maintenance-required condition, a low-tire-pressure condition, a headlights-on condition, a key-in-the-ignition condition, an unfastened-seatbelt condition, an engine-start condition, and an engine-shut-off condition. Also, the thematic vehicle interior includes a sensor for detecting a vehicle condition and actuating the feedback system to play the audio program.

One advantage of the present invention is that a thematic vehicle interior is provided that harmonizes both visual features and auditory sounds so as to create a predetermined theme within the vehicle.

Another advantage of the present invention is that a thematic vehicle interior is provided that differentiates the vehicle from other competing vehicles.

Yet another advantage of the present invention is that a thematic vehicle interior is provided that immediately alerts vehicle occupants of one or more predetermined vehicle conditions.

Other advantages of the present invention will become apparent when viewed in light of the detailed description of the invention when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
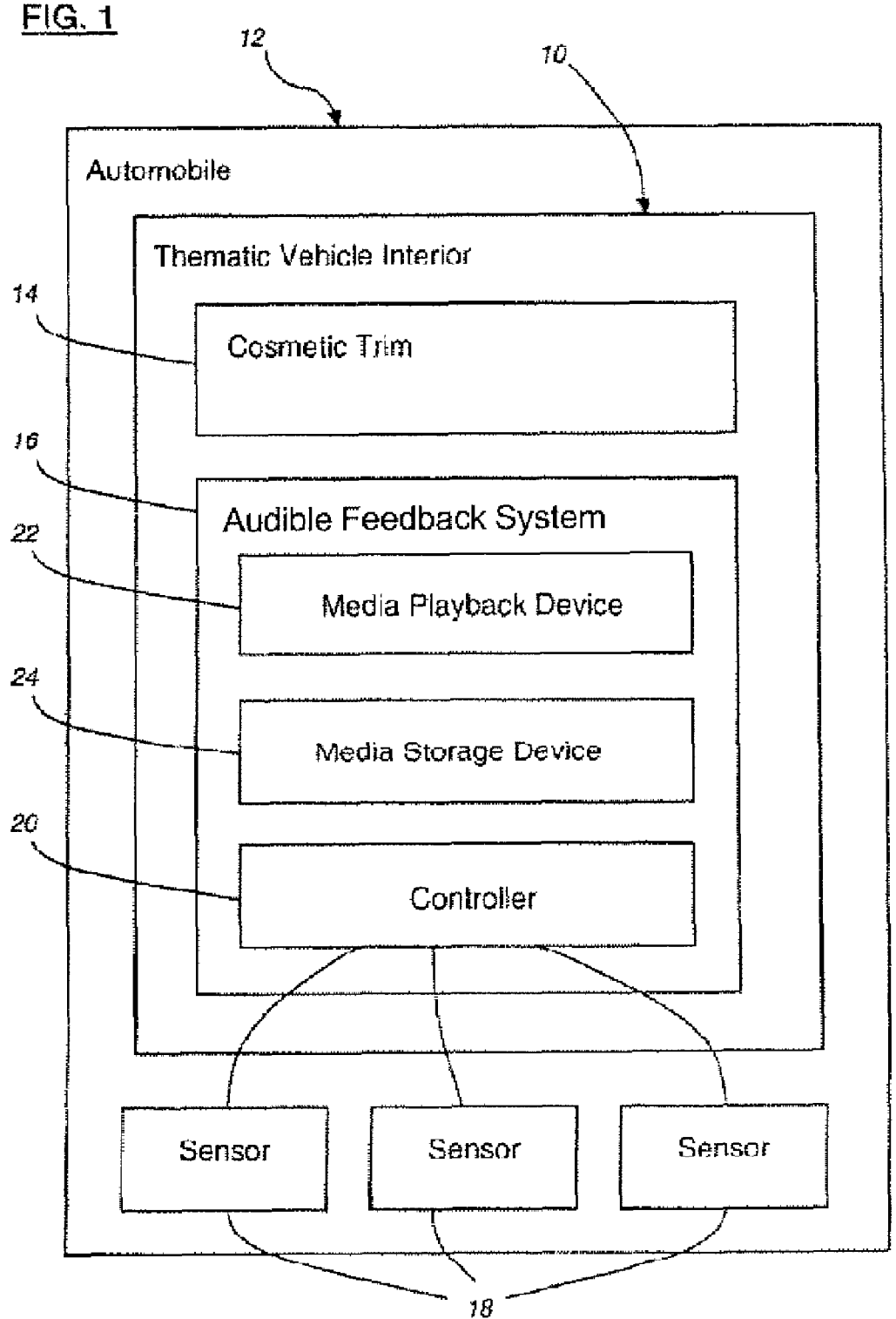
FIG. 1 is a representative diagram of a thematic vehicle interior, according to one advantageous embodiment of the claimed invention.

In the following figures, the same reference numerals are used to identify the same components in the various views. Furthermore, the illustrated embodiments described herein employ features where the context permits. Specifically, the embodiments described herein implement a thematic vehicle interior for an automobile. However, it is contemplated that the thematic vehicle interior can be utilized in a variety of other suitable environments, e.g. various watercrafts and aircrafts. In addition, other embodiments are contemplated having different combinations of the described features, having features other than those described herein, or lacking one or more of those features. For these reasons, it is understood that the invention can be carried out in a variety of suitable modes.

Referring to FIG. 1, there is shown a representative diagram of a thematic vehicle interior ("interior") 10 of an automobile 12, according to one advantageous embodiment of the claimed invention. The interior 10 is a passenger cabin having various vehicle components with predetermined cosmetic trim 14. For example, in this embodiment, the interior 10 is a luxuriously-appointed passenger cabin with a wood-trimmed steering wheel, a wood-trimmed dashboard fascia, a wood-trimmed gear shifter mechanism, a wood-trimmed vehicle door, a wood-trimmed center console, a wood-trimmed overhead eyewear receptacle, a wood-trimmed overhead transmitter receptacle, a wood-trimmed overhead light device, or any suitable combination thereof.

However, it is contemplated that the interior 10 can include various other suitable vehicle components with a variety of other cosmetic trim as desired. For instance, in another embodiment, the interior 10 is a sports-car passenger cabin with metallic dashboard fascia, a metallic-trimmed gear shift, a leather-wrapped steering wheel, and two-toned leather seats.

Moreover, the interior 10 further includes a feedback system 16 for alerting the vehicle occupant of one or more predetermined vehicle conditions. Specifically, this feedback system 16 includes one or more sensors 18 and a feedback system 16 coupled to the sensors 18. These sensors 18 are utilized for detecting the predetermined vehicle conditions and actuating the feedback system 16 to play one or more audio programs. Examples of these vehicle conditions include an open-door condition, a low-fuel condition, a maintenance-required condition, a low-tire-pressure condition, a headlights-on condition, a key-in-the-ignition condition, an unfastened-seatbelt condition, an engine-start condition, an engine-shut-off condition, various other suitable conditions, or any combination thereof. It will be appreciated that the feedback system 16 can be integrated within various other vehicles, e.g. watercraft, and therefore be utilized to indicate various other vehicle conditions.

One skilled in the art will appreciate that the feedback system 16 is a feedback system that is separate from a stereo system of the vehicle. However, it is contemplated that the feedback system 16 and the stereo system can be integrated into one system as desired.

The feedback system 16 includes a controller 20, which is coupled to and actuated by the sensors 18. This controller 20 is further coupled to a media player device 22 and a media storage device 24. The media storage device 24 is utilized for storing one or more audio programs that are assigned to one or more vehicle conditions. In this way, the controller 20 can actuate the media player device 22 to play a predetermined audio program for indicating, the detected vehicle condition.

In this embodiment, the controller 20 actuates the media player device 22 to play a series of audio programs with a variety of melodies and/or tones for indicating detected vehicle conditions. However, it is understood that the audio programs can instead vary according to volume, duration, or other suitable parameters as desired.

The audio programs preferably are related to the cosmetic trim of the passenger cabin so as to create a predetermined theme. For example, a vehicle interior 10 having a substantial amount of wooden trim includes a warning feedback system, which plays wooden-related audio programs. These wooden-related audio programs can be recordings from a xylophone, a tongue drum, a woodwind instrument, various other instruments related to wood, or any combination thereof. In this embodiment, a sensor 18 can detect that a door is ajar and send a corresponding signal to the controller 20. This controller 20 can then actuate the media player device 22 to play a predetermined audio program, e.g. a xylophone melody, assigned to an open-door condition. In that regard, the vehicle occupant can identify each audio program with its respective vehicle condition and immediately recognize the vehicle condition based only on the sound of the audio program.

By way of another example, other sensors 18 can simultaneously detect that the door is ajar and the key is left in the ignition. In response, the controller 20 can then actuate the media player device 22 to play predetermined audio programs, e.g. a xylophone melody and a tongue drum rhythm, each assigned to its respective vehicle condition. It will be appreciated that the sensors 18 can detect various combinations of vehicle conditions and actuate the feedback system 16 to play a variety of audio programs for identifying those vehicle conditions.

In another embodiment, as explained above, the interior 10 is a sports-car passenger cabin with metallic dashboard fascia, a metallic-trimmed gear shift, a leather-wrapped steering wheel, and two-toned leather seats. This interior 10 includes a feedback system for playing sports-related audio programs. These sports-related audio programs include a golf-swing sound, a golf-putting sound, a whistle sound, a horn sound, a buzzer sound, a baseball-bat sound, a football-tackle sound, a cheering-crowd sound, an organ sound, various other sports-related sounds, or any combination thereof. As stated hereinabove, each audio program is assigned to a predetermined vehicle condition so as to quickly alert the vehicle occupant of the vehicle condition.

It is contemplated that various other suitable audio programs can be utilized as desired. For instance, for a sports car having passenger cabin with youth-related trim can include a feedback system 16 for playing sound bytes of popular music. Alternatively, the feedback system 16 can be utilized for playing sound bytes taken from movies, television shows, sports broadcasts, other media programs, or any combination thereof. In this way, it will be appreciated that the youth-related trim can be associated with various audio programs that typically appeals to a youthful demographic.

Figure 2:
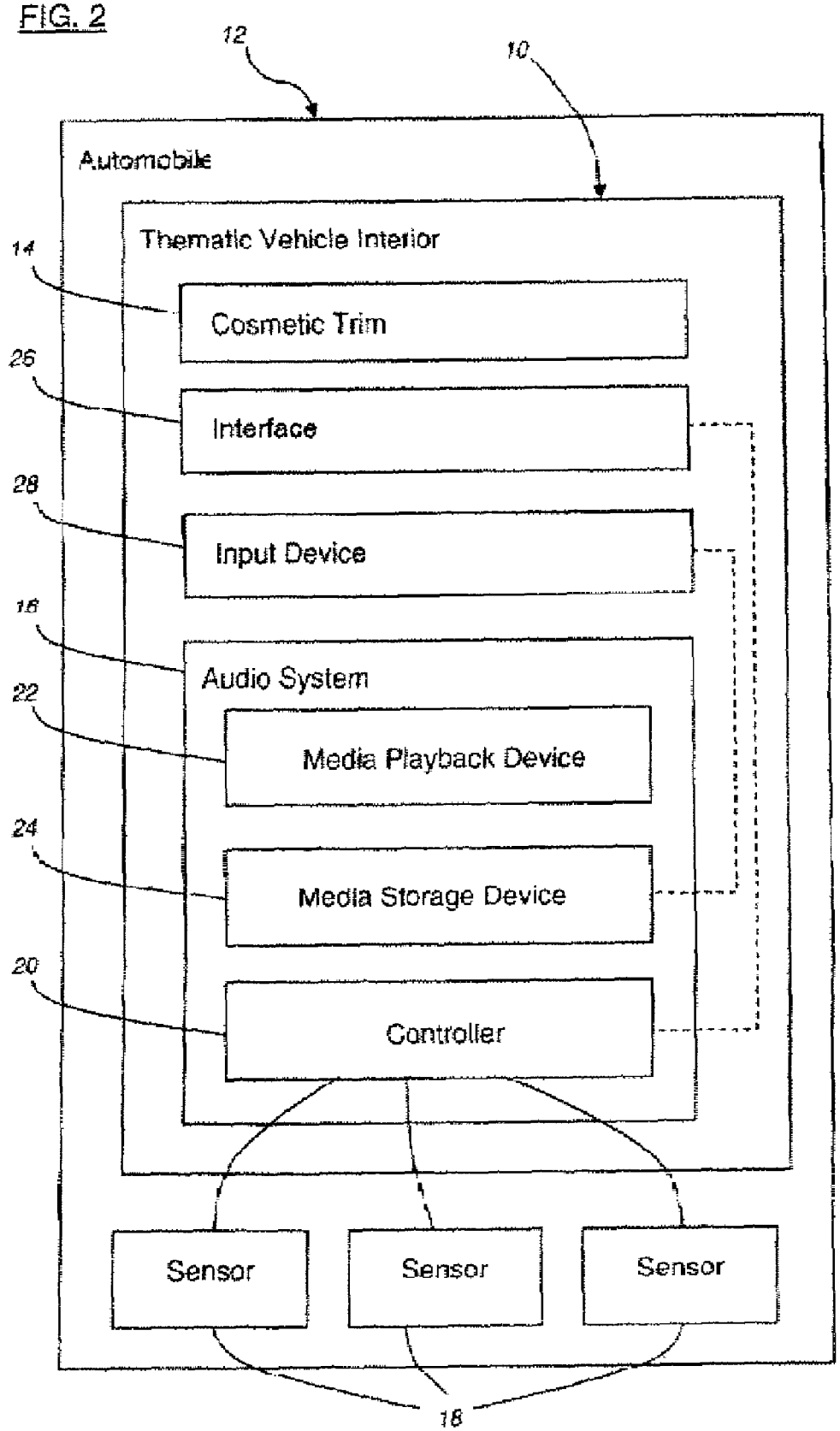
FIG. 2 is a representative diagram of a thematic vehicle interior, according to another advantageous embodiment of the claimed invention.

Referring now to FIG. 2, there is shown the thematic vehicle interior 10, according to another advantageous embodiment of the claimed invention. In this embodiment, the interior 10 further includes an interface 26 coupled to the controller 20 of the feedback system 16 for allowing a vehicle occupant to assign a particular audio program to a given vehicle condition. In this way, the interface 26 allows a vehicle occupant to customize the kinds of audio programs that are utilized for indicating the predetermined vehicle conditions.

Also in this embodiment, the media storage device 24 of the feedback system 16 is coupled to an input device 28 for receiving supplemental audio programs therefrom. The input device 28 is a CD player, an MP3 player, a microphone, a stereo system of the vehicle, a wireless radio frequency communication device various other media, or any combination thereof.

While particular embodiments of the invention have been shown and described, numerous variations and alternate embodiments will occur to those skilled in the art. Accordingly, it is intended that the invention be limited only in terms of the appended claims.

What is claimed is:

1. A thematic vehicle interior, comprising:
   a passenger cabin of the vehicle;
   a feedback system for playing a plurality of audio programs for alerting a vehicle occupant of a pluraliry of vehicle conditions, said plurality of vehicle conditions including at least one of an open-door condition, a low-fuel condition, a maintenance-required condition, a low-tire-pressure condition, a headlights-on condition, a key-in-the-ignition condition, an unfastened-seatbelt condition, an engine-start condition, and an engine-shut-off condition;
   a sensor for detecting said plurality of vehicle conditions and actuating said feedback system to play said plurality of audio programs;
   said plurality of audio programs providing a predetermined theme for said passenger cabin; and
   a cosmetic trim for attachment to the vehicle and being displayed within said passenger cabin;
   said cosmetic trim having a wooden appearance and said plurality of audio programs including a wooden-instrument sound.

2. The thematic vehicle interior recited in claim 1 wherein said wooden-instrument sound is recorded from at least one of a xylophone, a tongue drum, and a woodwind instrument.

3. The thematic vehicle interior recited in claim 1 wherein said cosmetic trim is coupled to at least one of a steering wheel, a dashboard fascia, a gear shifter mechanism, a vehicle door, a vehicle seat, a center console, an overhead eyewear receptacle, an overhead transmitter receptacle, and an overhead light device.

4. The thematic vehicle interior recited in claim 1 wherein said cosmetic trim includes a metallic material and said plurality of audio programs includes a sports-related sound.

5. The thematic vehicle interior recited in claim 4 wherein said sports-related sound includes at least one of a golf-swing sound, a golf-putting sound, a whistle sound, a horn sound, a buzzer sound, a baseball-bat sound, a football-tackle sound, a cheering-crowd sound, and an organ sound.

6. The thematic vehicle interior recited in claim 1 wherein said cosmetic trim includes a leather material and said plurality of audio programs includes a sports-related sound.

7. The thematic vehicle interior recited in claim 1 wherein said feedback system comprises:
- a media storage device for storing said plurality of audio programs; and
- a media playback device coupled to said media storage device for playing said plurality of audio programs.

8. A thematic vehicle interior, comprising:
- a passenger cabin of the vehicle;
- a cosmetic trim for attachment to the vehicle and being displayed within said passenger cabin;
- a feedback system for playing a plurality of audio programs for alerting a vehicle occupant of a plurality of vehicle conditions, each of said plurality of audio programs being associated with one of said plurality of vehicle conditions, said plurality of vehicle conditions including at least one of an open-door condition, a low-fuel condition, a maintenance-required condition, a low-tire-pressure condition, a headlights-on condition, a key-in-the-ignition condition, an unfastened-seatbelt condition, an engine-start condition, and an engine-shut-off condition; and
- a sensor for detecting said plurality of vehicle conditions and actuating said feedback system to play said plurality of audio programs;
- said plurality of audio programs and said cosmetic trim providing a predetermined theme to said passenger cabin;
- said cosmetic trim having a wooden appearance and said plurality of audio programs including a wooden-instrument sound.

9. The thematic vehicle interior recited in claim 8 wherein each of said plurality of audio programs has a predetermined melody.

10. The thematic vehicle interior recited in claim 8 wherein each of said plurality of audio programs has a predetermined volume.

11. The thematic vehicle interior recited in claim 8 wherein each of said plurality of audio programs has a predetermined duration.

12. The thematic vehicle interior recited in claim 8 wherein said wooden-instrument sound is recorded from at least one of a xylophone, a tongue drum, and a woodwind instrument.

13. The thematic vehicle interior recited in claim 8 wherein said cosmetic trim is coupled to at least one of a steering wheel, an dashboard fascia, a gear shifter mechanism, a vehicle door, a vehicle seat, a center console, an overhead eyewear receptacle, an overhead transmitter receptacle, and an overhead light device.

14. A thematic vehicle interior, comprising:
- a passenger cabin of the vehicle;
- a cosmetic trim for attachment to the vehicle and being displayed within said passenger cabin;
- a feedback system for playing a plurality of audio programs for alerting a vehicle occupant of a plurality of vehicle conditions, each of said plurality of audio programs being associated with one of said plurality of vehicle conditions, said plurality of vehicle conditions including at least one of an open-door condition, a low-fuel condition, a maintenance-required condition, a low-tire-pressure condition, a headlights-on condition, a key-in-the-ignition c ondition, an unfastened-seatbelt condition, an engine-start condition, and an engine-shut-off condition; and
- a sensor for detecting said plurality of vehicle conditions and actuating said feedback system to play said plurality of audio programs;
- said plurality of audio programs and said cosmetic trim providing a predetermined theme to said passenger cabin;
- said cosmetic trim including a metallic material and said plurality of audio programs including a sports-related sound.

15. The thematic vehicle interior recited in claim 14 wherein said sports-related sound includes at least one of a golf-swing sound, a golf-putting sound, a whistle sound, a horn sound, a buzzer sound, a baseball-bat sound, a football-tackle sound, a cheering-crowd sound, and an organ sound.

16. The thematic vehicle interior recited in claim 14 wherein said cosmetic trim includes a leather material and said plurality of audio programs includes a sports-related sound.

* * * * *